United States Patent
Hanni et al.

(10) Patent No.: US 9,111,307 B1
(45) Date of Patent: Aug. 18, 2015

(54) MARKETPLACE PRODUCT CATALOG LAYERING

(75) Inventors: Jeremy Brian Hanni, Seattle, WA (US); Sanjay Govindrao Kulkarni, Redmond, WA (US); Soumyadip Banerjee, Belleville, WA (US); Pejus Manoj Das, Shoreline, WA (US); Huang-Chun Yu, Seattle, WA (US); Andrew Powell McGoogan, Seattle, WA (US); Christopher E. Browder, Bellevue, WA (US); Shaun M. Vickers, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 297 days.

(21) Appl. No.: 13/347,960

(22) Filed: Jan. 11, 2012

(51) Int. Cl.
*G06Q 30/06* (2012.01)

(52) U.S. Cl.
CPC ........ *G06Q 30/0603* (2013.01); *G06Q 30/0613* (2013.01)

(58) Field of Classification Search
CPC .................. G06Q 30/0603; G06Q 30/0601
USPC .......................................... 705/26.1
See application file for complete search history.

(56) References Cited

U.S. PATENT DOCUMENTS

| | | | |
|---|---|---|---|
| 2007/0265934 A1* | 11/2007 | Hassman et al. | 705/26 |
| 2010/0042515 A1* | 2/2010 | Crespo et al. | 705/27 |

* cited by examiner

*Primary Examiner* — Mila Airapetian
(74) *Attorney, Agent, or Firm* — Lee & Hayes, PLLC

(57) ABSTRACT

A merchant system is disclosed that can provide multiple online marketplaces that utilize marketplace product catalog layering. Product catalogs associated with each marketplace may be defined and layered such that products sold by one marketplace may be displayed on and purchased by way of another marketplace. The merchant system might also provide a unified electronic shopping cart for storing purchases made at multiple marketplaces, a unified checkout user interface for completing the purchase of items from multiple marketplaces, and a unified order management user interface for managing purchases made from multiple marketplaces.

22 Claims, 6 Drawing Sheets

MARKETPLACE PRODUCT CATALOG LAYERING

BACKGROUND

Many individuals and companies operate e-commerce World Wide Web ("Web") sites. Customers and potential customers of such Web sites can browse and search for products, purchase products, read and leave reviews for products, and perform other functions. E-commerce Web sites have become one of the primary ways that consumers purchase products today.

Although many individuals and companies operate e-commerce Web sites, there are still many other individuals and companies that would like to operate an e-commerce Web site but that do not. In many cases, this is due to the technical and economic challenges associated with operating an e-commerce Web site. For instance, it may be prohibitively time consuming, technically difficult, and/or expensive for an individual or a small company to create and operate an e-commerce Web site that includes electronic shopping cart functionality, payment processing, and other functions that are required to be competitive with other e-commerce Web sites.

It might also be cost prohibitive for individuals and small companies to offer large numbers of items for sale on their e-commerce Web sites. For example, it might be logistically difficult and/or cost prohibitive for a small company that sells digital music players to also stock and sell all of the various cases, chargers, adapters, and other common accessories for each digital music player the company sells. As a result, the company might operate an e-commerce Web site that offers a relatively small selection of products, or might not operate an e-commerce Web site altogether.

It is with respect to these and other considerations that the disclosure made herein is presented.

DETAILED DESCRIPTION

Figure 1:
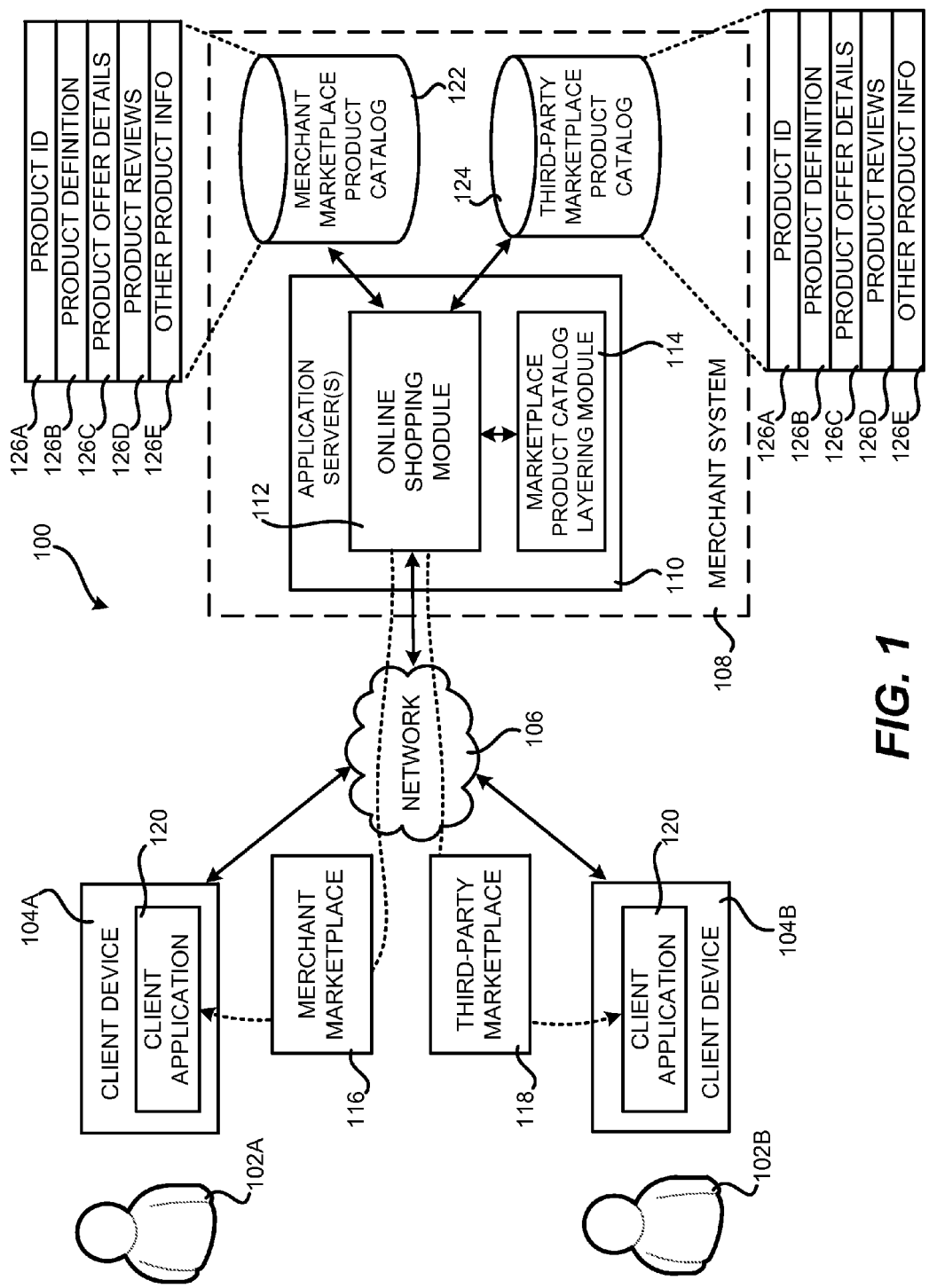
FIG. 1 is a system diagram showing an illustrative configuration for a merchant system that is configured to provide marketplace product catalog layering, according to one embodiment disclosed herein.

The following detailed description is directed to technologies for marketplace product catalog layering. Through an implementation of the concepts and technologies disclosed herein, a merchant system can provide functionality for allowing a customer of the merchant system (referred to herein as a "third-party merchant") to easily create an online marketplace, such as an e-commerce Web site. The third-party merchant can specify the products that are to be sold through their marketplace along with details for the products, such as a description and price of each product. The merchant system can then provide the marketplace on behalf of the third-party merchant, including shopping cart, payment processing, and other types of functionality.

According to embodiments, the merchant system is also configured to provide functionality for marketplace product catalog layering. Marketplace product catalog layering refers to a process of layering the product catalogs of two or more marketplaces. For example, the merchant system might be configured to provide a merchant marketplace on behalf of the operator of the merchant system. The products offered for sale by way of the merchant marketplace might be listed in a merchant marketplace product catalog. The merchant system might also be configured to provide a third-party marketplace on behalf of a third-party merchant. The products offered for sale by the third-party merchant through the third-party marketplace might be identified by the third-party merchant and stored in a third-party marketplace product catalog.

When a request is received at the merchant system for a product page on the third-party marketplace, the merchant system generates the product page using data in either the merchant marketplace product catalog or the third-party marketplace product catalog. For example, in one embodiment the merchant system determines in response to receiving a request for a product page at a third-party marketplace whether the referenced product is identified in the third-party marketplace product catalog. If the product is identified in the third-party product catalog, the third-party marketplace product catalog is utilized to generate the requested product page. For instance, a product description and price might be retrieved from the third-party marketplace product catalog and utilized to generate the requested product page.

If the product referenced by the requested product page is not identified in the third-party product catalog, the merchant marketplace product catalog may be utilized to generate the requested product page. For example, the product description and price might be retrieved from the merchant marketplace product catalog and utilized to generate the requested product page. In this manner, the merchant marketplace product catalog is "layered" over the third-party marketplace product catalog. If a customer purchases a product directly from the third-party marketplace, the third-party merchant receives the sales revenue from the purchase. If a customer purchases a product from the third-party marketplace that is sold by the merchant marketplace, the third-party merchant may receive a commission on the sale.

Using the mechanism described above, a third-party merchant can offer an online marketplace that displays not only the products sold by the third-party merchant, but also products sold by the merchant that operates the merchant system or any other third-party marketplace merchant. Products sold by other marketplaces can be offered without the need to negotiate vendor agreements or the need to purchase and store inventory. As described below, the third-party merchant may be permitted to configure the manner in which catalog layering occurs on its marketplace.

Information stored in the product catalogs associated with various marketplaces provided by the merchant system might also be layered in other ways. For example, when a request for a product page is received at the third-party marketplace, data from the merchant marketplace product catalog might be utilized to generate the requested page even when the third-party merchant sells the product. For example, customer reviews generated at the merchant marketplace may be retrieved from the merchant marketplace product catalog and utilized to generate product pages requested from the third-party marketplace. In other embodiments, data for related products such as product accessories might also be retrieved from the merchant marketplace product catalog and utilized to generate product pages requested from the third-party marketplace. In this way, a third-party merchant can provide a marketplace that suggests product accessories to customers of the marketplace, even when the third-party merchant does not directly sell the suggested accessories.

In other implementations, the catalog layering functionality described above might be utilized for inventory backup. For instance, in one embodiment a determination is made when a request is received at a third-party marketplace for a product page as to whether the third-party merchant has the referenced product in stock. If the third-party merchant does have the product in stock, the third-party marketplace product catalog is utilized to generate the requested product page. If the third-party merchant does not have the product in stock, the merchant marketplace product catalog may be utilized to generate the requested product page. In this way, product stock maintained by the merchant that operates the merchant system, or another third-party merchant, can be utilized to "back up" the product stock of the third-party merchant.

According to other aspects, the merchant system is also configured to provide a unified electronic shopping cart to customers of the third-party marketplace that utilizes catalog layering. For instance, a customer of the third-party marketplace may elect to purchase a first product that is offered for sale directly from the third-party merchant by way of the third-party marketplace. The customer might also elect to purchase a product sold through the merchant marketplace that is displayed on the third-party marketplace. In this case, a unified electronic shopping cart is presented to the customer that contains purchases from both the third-party marketplace and the merchant marketplace. The merchant system might utilize separate shopping cart instances, one for the merchant marketplace and one for the third-party marketplace, to provide the unified shopping cart to the customer.

The merchant system might also be configured to provide a unified checkout user interface. Through such a user interface, a customer of the third-party marketplace can pay for and complete the purchase of products purchased from the third-party marketplace and from the merchant marketplace. In this way, the customer only needs to utilize one checkout process to purchase items from multiple marketplaces. Additionally, separate order confirmation messages may be provided to the customer for items purchased from each marketplace.

In other embodiments, the merchant system is also configured to provide a unified order management user interface. Through such a user interface a customer can manage purchases made from multiple marketplaces. The customer may be permitted to access the unified order management user interface through the merchant marketplace or through the third-party marketplace. Other aspects regarding marketplace product catalog layering and the related functionality disclosed herein will be provided below with regard to FIGS. 1-6.

It should be appreciated that the embodiments disclosed herein might be utilized with any type of computer, computing system, device, Web site, application program, operating system, or other type of system or component. Accordingly, although the embodiments disclosed herein are primarily presented in the context of a merchant system that embodies the concepts disclosed herein for marketplace product catalog layering, the disclosure presented herein is not limited to such an implementation.

It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following discussion are intended to provide a brief, general description of a suitable computing environment in which the embodiments described herein may be implemented. In particular, FIG. 1 is a system and network diagram that shows an illustrative operating environment 100 including several software components for providing marketplace product catalog layering and related functionality. As discussed above, the environment 100 is merely illustrative and the embodiments disclosed herein might be utilized in many different types of environments.

The environment 100 includes a merchant system 108 that is configured to provide marketplace product catalog layering and related functionality described herein.

In order to provide this functionality, the merchant system 100 utilizes a number of application servers 110 in one implementation. The application servers 110 may execute a number of modules in order to provide the functionality disclosed herein to one or more client devices 104A-104B. The modules may execute on a single application server 110 or in parallel across multiple application servers in the merchant system 108. In addition, each module may consist of a number of subcomponents executing on different application servers 110 or other computing devices in the merchant system 108. The modules may be implemented as software, hardware, or any combination of the two.

According to one embodiment, an online shopping module 112 executes on the application servers 110. The online shopping module 112 provides functionality for providing online marketplaces. Online marketplaces are network-accessible information sites, such as e-commerce Web sites, which allow customers to browse, search, and purchase products. For instance, an online marketplace might allow customers to browse and purchase physical or digital items.

In one embodiment the online shopping module 112 is configured to provide a merchant marketplace 116. The merchant marketplace 116 allows users, such as the user 102A in FIG. 1, to browse, search, and purchase products (which might also be referred to herein as "items") sold by the online merchant that operates the merchant system 108. For instance, the online shopping module 112 may retrieve information regarding a particular product offered for sale by the online merchant from a merchant marketplace product catalog 122, generate a product page containing product information, and transmit the page over the network 106 to the client application 120 executing on the client device 104A for display to the user 102A.

According to various implementations, the online shopping module 112 utilizes stored and/or dynamically generated resources to provide the merchant marketplace 116 and the other marketplaces described herein. Such resources might include, for instance, Web pages, images, text files, program code for generating Web pages, metadata, scripts, executable code, and other types of data utilized to create and/or provide a Web page. The online shopping module 112 might also maintain a customer profile data store including information about customers of the merchant system 108, such as their name, address and other contact information, payment information, preferences, and other data. Customer profile information might also be maintained on a per-marketplace basis and shared between marketplaces.

As illustrated in FIG. 1, the merchant marketplace product catalog 122 includes records for each product offered for sale by the merchant that operates the merchant system 108. The online shopping module 112 might utilize the records to generate product pages in response to requests from client devices 104. Each record includes a number of fields, such as the illustrative fields 126A-126E. In the example shown in FIG. 1, the field 126A is utilized to store a unique product identifier for a product, such as a stock keeping unit ("SKU") number, a universal product code ("UPC"), an international article number ("EAN"), or a merchant-assigned identifier. Other types of product identifiers might also be utilized, however, the product identifier for a product is the same across all of the marketplaces described herein.

The field 126B is utilized to store a product definition. The product definition might include, for instance, a name of the product, a description of the product, and other information regarding the product. The field 126C is utilized to store product offer details. The product offer details include a price for the product and any other offer information. For instance, the product offer details might also specify that free shipping is available for the product.

According to embodiments, the merchant marketplace product catalog 122 might also store other types of information regarding a product. As an example, the merchant marketplace 116 may be configured to collect customer reviews of products. The reviews for a product may be stored in the field 126D of a record associated with the product. In this manner, the reviews for a product can be displayed to a customer viewing a product page for the product. Other product information for a product, such as an in-stock quantity of the product, might be stored in a field 126E or in another field.

It should be appreciated that the fields 126A-126E described above are merely illustrative and that more or fewer fields than shown in FIG. 1 might be utilized, the data stored in the fields 126 might be arranged differently, and other product information might also be stored for each product. It should also be appreciated that virtually any suitable database technology might be utilized to implement the merchant marketplace product catalog 122 and the third-party marketplace product catalog 124 described below.

According to various implementations, the online shopping module 112 also provides functionality for allowing a third-party merchant to create their own marketplace, referred to herein as a third-party marketplace 118. For instance, the online shopping module 112 might provide a user interface through which the third-party merchant can specify the products that are to be sold through the third-party marketplace 118, along with details for the products, such as a description and price of each product. This information is then stored in a third-party marketplace product catalog 124. As shown in FIG. 1, records stored in the third-party marketplace product catalog 124 might include similar fields 126A-126E as those used in records in the merchant marketplace product catalog 122 described above.

The online shopping module 112 might also provide a user interface through which the third-party merchant can define visual aspects of the third-party marketplace 118. For example, the third-party merchant might specify graphics and other visual elements corresponding to its particular brand. In this manner, the third-party marketplace 118 can be defined such that it reflects the branding of the third-party merchant and is easily distinguished from the merchant marketplace 116. Additionally, the third-party merchant might specify a uniform resource locator ("URL") that is utilized to access the third-party marketplace 118. The third-party merchant might also be permitted to configure many other aspects of the operation of the third-party marketplace 118.

Once the third-party merchant has completed defining the various operational aspects of the third-party marketplace 118, the merchant system 108 can then provide the third-party marketplace 118 on behalf of the third-party merchant. For example, a user 102B utilizing a client device 104B might access the third-party marketplace 118 over the network 106 and request a page for a product sold by the third-party merchant. In response to receiving such a request, the online shopping module 112 will generate the requested product page using data stored in the third-party marketplace product catalog 124, such as the product identifier, product definition, and offer details described above. The user 102B might also add the product to an electronic shopping cart provided by the merchant system 108 in order to purchase the product.

If the user 102B elects to complete the purchase of the product, the merchant system 108 might provide a checkout mechanism, including payment-processing capabilities. The third-party merchant might be permitted to brand or otherwise customize the checkout mechanism provided by the merchant system 108. The merchant system 108 might also provide other types of functionality for implementing the third-party marketplace 118 on behalf of the third-party merchant.

As discussed briefly above, the environment 100 includes one or more users 102A-102B who use client devices 104A-104B to access the merchant system 108 through a network 106. The users 102A-102B may be individuals or entities that desire to browse, search, purchase, or have purchased, one or more products from the marketplaces 116 and 118. The client devices 104A-104B may be personal computers ("PC"), desktop workstations, laptop computers, tablet computers, notebook computers, personal digital assistants ("PDAs"), electronic-book readers, game consoles, set-top boxes, consumer electronics devices, server computers, or any other type of computing device capable of connecting to the network 106 and communicating with the merchant system 108. The users 102 might also be referred to herein as "visitors" to the marketplaces 116 and 118 or "customers" of the marketplaces 116 and 118.

The network 106 may be a local-area network ("LAN"), a wide-area network ("WAN"), the Internet, or any other networking topology known in the art that connects the client devices 104A-104B to the merchant system 108. As discussed above, the merchant system 108 may include a number of application servers 110 that provide various online shopping services to the client devices 104A-104B over the network 106. The users 102A-102B may use a client application 120 executing on their respective client devices 104 to access and utilize the online shopping services provided by the application servers 110.

In one embodiment the client application 120 is a Web browser application, such as the MOZILLA® FIREFOX® Web browser from MOZILLA FOUNDATION of Mountain View, Calif. The client application 120 exchanges data with the application servers 110 in the merchant system 108 using the hypertext transfer protocol ("HTTP") or another appropriate protocol over the network 106. The client application 120 might also be a stand-alone client application configured for communicating with the application servers 110. The client application might also utilize any number of communication methods known in the art to communicate with the merchant system 108 and/or the application servers 110 across the network 106, including remote procedure calls, SOAP-based Web services, remote file access, proprietary client-server architectures, and the like.

As discussed briefly above, the online shopping module 112 is configured in one embodiment to execute in conjunction with a marketplace product catalog layering module 114. The marketplace product catalog layering module 114 provides the functionality described herein for marketplace product catalog layering. Marketplace product catalog layering refers to a process of layering the product catalogs of two or more marketplaces. For example, when the online shopping module 112 receives a request for a product page on the third-party marketplace 118 in one embodiment, the online shopping module 112 may determine whether the referenced product is identified in the third-party marketplace product catalog 124 (i.e. a record with a product identifier for the referenced product is in the catalog 124). If the referenced product is identified in the third-party marketplace product catalog 124, the online shopping module 112 utilizes the third-party marketplace product catalog 124 to generate the requested product page. For instance, a product description and price might be retrieved from the fields 126B and 126C, respectively, of a record for the product in the third-party marketplace product catalog 124 and utilized to generate the requested product page.

If the product referenced by the requested product page is not identified in the third-party marketplace product catalog 124, the online shopping module 112 may utilize the merchant marketplace product catalog 122 to generate the requested product page. For example, the product description and price might be retrieved from the merchant marketplace product catalog 122 and utilized to generate the requested product page. In this manner, the merchant marketplace product catalog 122 is "layered" over the third-party marketplace product catalog 124. If a customer purchases a product from the third-party marketplace 118 that is sold by the merchant marketplace 116, the third-party merchant may receive a commission on the sale.

Using the mechanism described above, a third-party merchant can offer an online marketplace 118 that displays not only the products sold by the third-party merchant, but also products sold by the merchant that operates the merchant system 108 or any other third-party marketplace merchant. As will be discussed in detail below with regard to FIG. 2, the third-party merchant may be permitted to configure the manner in which catalog layering occurs on its marketplace.

Information stored in the product catalogs 122 and 124 associated with the marketplaces 116 and 118 provided by the merchant system 108 might also be layered in other ways. For example, when a request for a product page is received at the third-party marketplace 118, data from the merchant marketplace product catalog 122 might be utilized to generate the requested page even when the third-party merchant sells the referenced product. For example, customer reviews generated at the merchant marketplace 116 may be retrieved from the merchant marketplace product catalog 122 and utilized to generate product pages requested from the third-party marketplace 118. In other embodiments, data for related products such as product accessories might also be retrieved from the merchant marketplace product catalog 122 and utilized to generate product pages requested from the third-party marketplace 118. In this way, a third-party merchant can provide a marketplace 118 that suggests product accessories to customers of the marketplace 118, even when the third-party merchant does not directly sell the suggested accessories. Additional details regarding this process will be provided below.

In some embodiments, the marketplace product catalog layering module 114 might provide a user interface through which the merchant that operates the merchant system 108 can specify the third-party merchants that are eligible to utilize the catalog layering functionality disclosed herein. The marketplace product catalog layering module 114 might provide a user interface through which the merchant can specify which products in the merchant marketplace product catalog 122 are eligible for catalog layering. The module 114 might also provide other mechanisms for allowing the merchant to configure other aspects of the operation of the catalog layering functionality disclosed herein.

In other implementations, the catalog layering functionality described above might be utilized for inventory backup. For instance, in one embodiment a determination is made when a request is received at a third-party marketplace 118 for a product page as to whether the third-party merchant has the referenced product in stock. If the third-party merchant does have the product in stock, the third-party marketplace product catalog 124 is utilized to generate the requested product page. If the third-party merchant does not have the product in stock, the merchant marketplace product catalog 122 may be utilized to generate the requested product page. In this way, product stock maintained by the merchant that operates the merchant system 108, or another third-party merchant, can be utilized to "back up" the product stock of the third-party merchant.

According to other aspects, the merchant system 108 is also configured to provide a unified electronic shopping cart to customers of a third-party marketplace 118 that utilizes catalog layering. For instance, a customer 102B of the third-party marketplace 118 may elect to purchase a first product that is offered for sale directly from the third-party merchant by way of the third-party marketplace 118. The customer 102B might also elect to purchase a product sold through the merchant marketplace 116 that is displayed on the third-party marketplace 118 in the manner described above. In this case, a unified electronic shopping cart is presented to the customer 102B that contains purchases from both the third-party marketplace 118 and the merchant marketplace 116. The merchant system 108 might utilize separate shopping cart instances, one for the merchant marketplace 116 and one for the third-party marketplace 118, to provide the unified shopping cart to the customer 102B. Additional details regarding this mechanism will be provided below with regard to FIGS. 4 and 5.

The merchant system 108 might also be configured to provide a unified checkout user interface. Through such a user interface, a customer 102B of the third-party marketplace 118 can pay for and complete the purchase of products purchased from the third-party marketplace 118 and from the merchant marketplace 116. In this way, the customer 102B only needs to utilize one checkout process to purchase items from multiple marketplaces. Additionally, separate order confirmation messages may be provided to the customer 102B for items purchased from each marketplace. Additional details regarding these aspects will also be provided below with regard to FIGS. 4 and 5.

In other embodiments, the merchant system 108 is also configured to provide a unified order management user interface. Through such a user interface a customer can manage purchases made from multiple marketplaces. The customer may be permitted to access the unified order management user interface through the merchant marketplace 116 or through the third-party marketplace 118. Additional details regarding this feature will also be provided below with regard to FIGS. 4 and 5.

It should be appreciated that while only a single third-party marketplace 118 has been illustrated in FIG. 1, the online shopping module 112 may be utilized to create and provide many more third-party marketplaces 118. In this regard, each of the marketplaces, including the merchant marketplace 116, may be assigned a unique identifier that is utilized to identify the marketplace. Additionally, each third-party marketplace 118 may be configured in the manner described above and the products available from each third-party marketplace 118 may be defined and stored in a unique third-party marketplace product catalog 124 associated with each marketplace. The product catalogs of each third-party marketplace 118 may be layered with the products from one or more other third-party marketplaces 118 and/or the products from the merchant marketplace 116 in the manner presented herein. Additional details regarding marketplace product catalog layer and related functionality will be provided below with regard to FIGS. 2-6.

Figure 2:
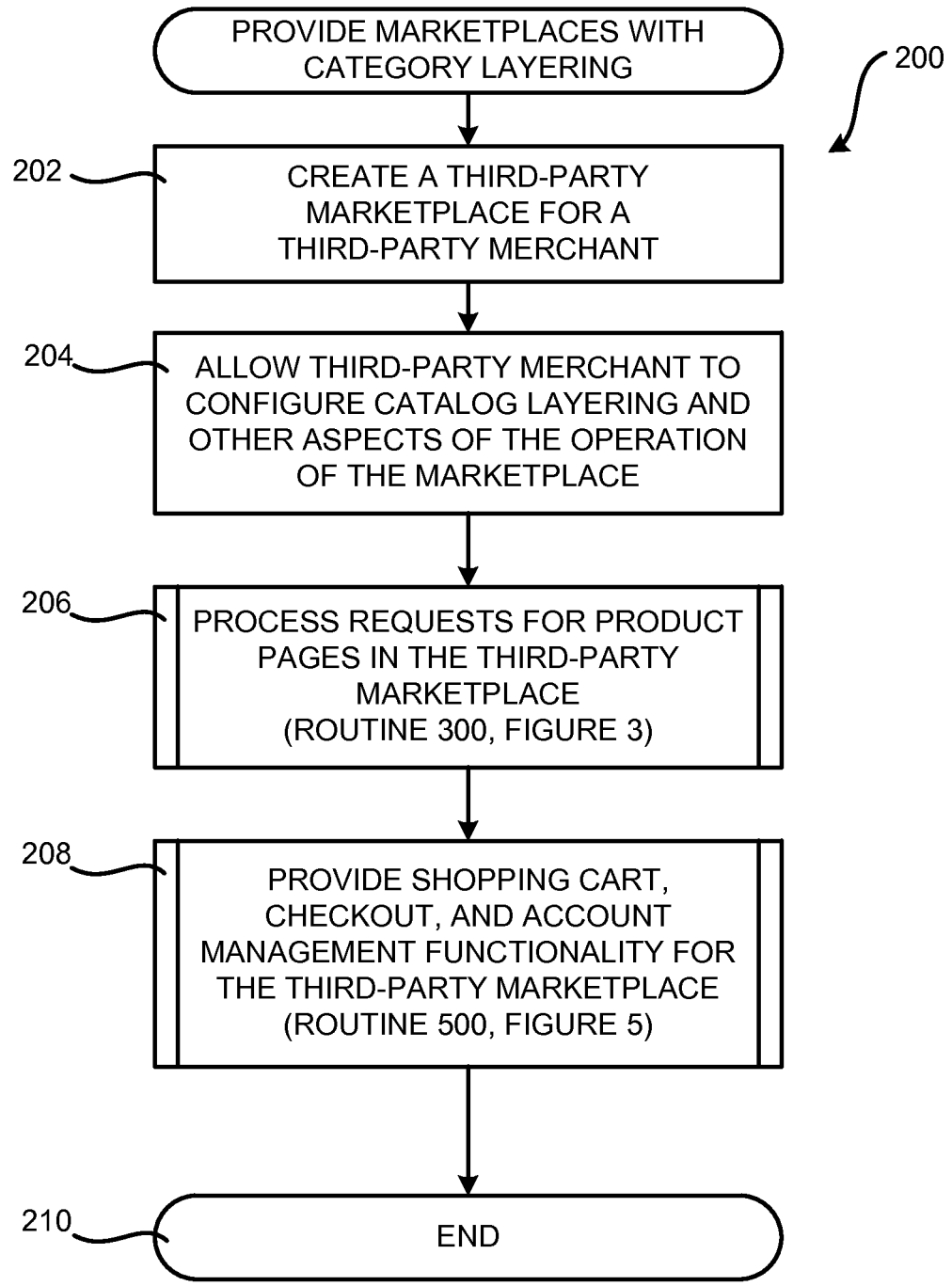
FIG. 2 is a flow diagram showing aspects of one illustrative routine for providing a marketplace with product catalog layering, according to one embodiment disclosed herein.

Turning now to FIG. 2, additional details will be provided regarding the embodiments described herein for marketplace product catalog layering. It should be appreciated that the logical operations described herein are implemented (1) as a sequence of computer implemented acts or program modules running on a computing system and/or (2) as interconnected machine logic circuits or circuit modules within the computing system.

The implementation of the logical operations described herein is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGURES and described herein. These operations may also be performed in parallel, or in a different order than described herein.

FIG. 2 is a flow diagram showing aspects of one illustrative routine 200 for providing a third-party marketplace 118 with catalog layering, according to one embodiment disclosed herein. The routine 200 begins at operation 202, where the merchant system 108 creates a third-party marketplace 118 for a third-party merchant. As discussed above, the merchant system 108 might provide a suitable user interface for allowing the third-party merchant to configure the "look and feel" of the third-party marketplace 118. For instance, the third-party merchant may be permitted to submit graphics for use on the third-party marketplace 118. In this manner, the third-party merchant can define a third-party marketplace 118 that reflects its own style and/or company branding. The third-party merchant might also be permitted to configure other aspects regarding the look and/or operation of the third-party marketplace 118.

From operation 202, the routine 200 proceeds to operation 204, where the third-party merchant is permitted to configure the manner in which catalog layering is to be utilized with the third-party marketplace 118. An appropriate user interface may be provided that allows the third-party merchant to configure product catalog layering. For example, a user interface may be provided through which the third-party merchant can indicate whether or not catalog layering should be utilized with the third-party marketplace 118. If the third-party merchant chooses to utilize catalog layering, additional user interfaces may be provided through which the third-party merchant can configure the manner in which catalog layering is to occur.

In one implementation, the third-party merchant may be permitted to specify that catalog layering be utilized for any product that is not listed in the third-party marketplace product catalog 124. In this manner, any request received at the third-party marketplace 118 for a page for a product that is not identified in the third-party marketplace product catalog 124 may be satisfied utilizing the product catalog of another marketplace. In this regard, the third-party merchant might be permitted to specify a priority-ordered list of marketplaces that should be utilized for catalog layering and the conditions under which items from other marketplace product catalogs should be presented. In this regard, it should be appreciated that catalog layering may be utilized with virtually any number of marketplaces. Other ways in which the third-party merchant might configure product catalog layering are discussed below.

The third-party merchant might also be permitted to specify that catalog layering should be utilized to implement inventory backup in the manner discussed above. In this way, another marketplace product catalog can be utilized to satisfy requests for product pages corresponding to products that the third-party merchant does not currently have in stock.

The third-party merchant might also be permitted to define the criteria utilized to determine the offers from other marketplaces that are to be displayed. For example, the third-party merchant might specify that only offers from the merchant that operates the merchant system 108 (i.e. offers on the merchant marketplace) are to be utilized for catalog layering. The third-party merchant might also be permitted to specify that only offers from other merchants that have a certain minimum reseller rating (i.e. customer satisfaction rating) be utilized for catalog layering, that only offers likely to generate a certain amount of profit or profit margin be utilized, that only offers for products that can be shipped to or received by the buyer within a certain amount of time be utilized, and/or that only offers from merchants offering certain promotions (i.e. free shipping) should be utilized. The third-party merchant might also be permitted to specify other criteria, factors, and/or considerations that should be utilized when determining which merchants and/or offers to utilize for product catalog layering.

According to various implementations, the third-party merchant might also be permitted to specify that information from other product catalogs be utilized to supplement the contents of the third-party marketplace product catalog 124. For example, the third-party merchant might specify that product reviews and/or other data stored in the merchant marketplace product catalog 122 be utilized to supplement the product data stored in the third-party marketplace product catalog 124. In this way, a product page can be generated for the third-party marketplace 118 that includes a product definition and product offer details from the third-party marketplace product catalog 124 and product reviews and potentially other information for the product from the merchant marketplace product catalog 122.

The third-party merchant might also be permitted to specify that data for related products, such as product accessories, be retrieved from the merchant marketplace product catalog 122, or another marketplace product catalog, and utilized to generate product pages requested from the third-party marketplace 118. In this way, the third-party marketplace 118 can generate product pages that include suggestions of related product accessories, even when the third-party merchant does not directly sell the suggested accessories.

The third-party merchant might also be permitted to specify that advertisements obtained from the merchant system 108 be displayed on the pages of the third-party marketplace 118. If a customer selects one of the displayed advertisements, the third-party merchant and the merchant operating the merchant system 108 may share in a commission paid by the advertiser.

It should be appreciated that the mechanisms described above for allowing the third-party merchant to specify the manner in which catalog layering should occur are merely illustrative. In other implementations, the third-party merchant might be permitted to configure product catalog layering in other ways.

Once the third-party merchant has completed the configuration of the third-party marketplace 118, the merchant system 108 can begin providing the third-party marketplace 118. In particular, once the third-party merchant has completed the configuration of the third-party marketplace 118, the routine 200 proceeds to operation 206, where the online shopping module 112 and/or the marketplace product catalog layering module 114 begin processing requests for product pages received at the third-party marketplace 118. One illustrative mechanism for processing requests for pages at the third-party marketplace 118 will be described below with regard to FIG. 3.

From operation 206, the routine 200 proceeds to operation 208, where the merchant system 108 provides a unified shopping cart, a unified checkout user interface, and/or a unified order management user interface to customers of the third-party marketplace 118. Additional details regarding these processes will be provided below with regard to FIGS. 4 and 5. From operation 208, the routine 200 proceeds to operation 210, where it ends.

Figure 3:
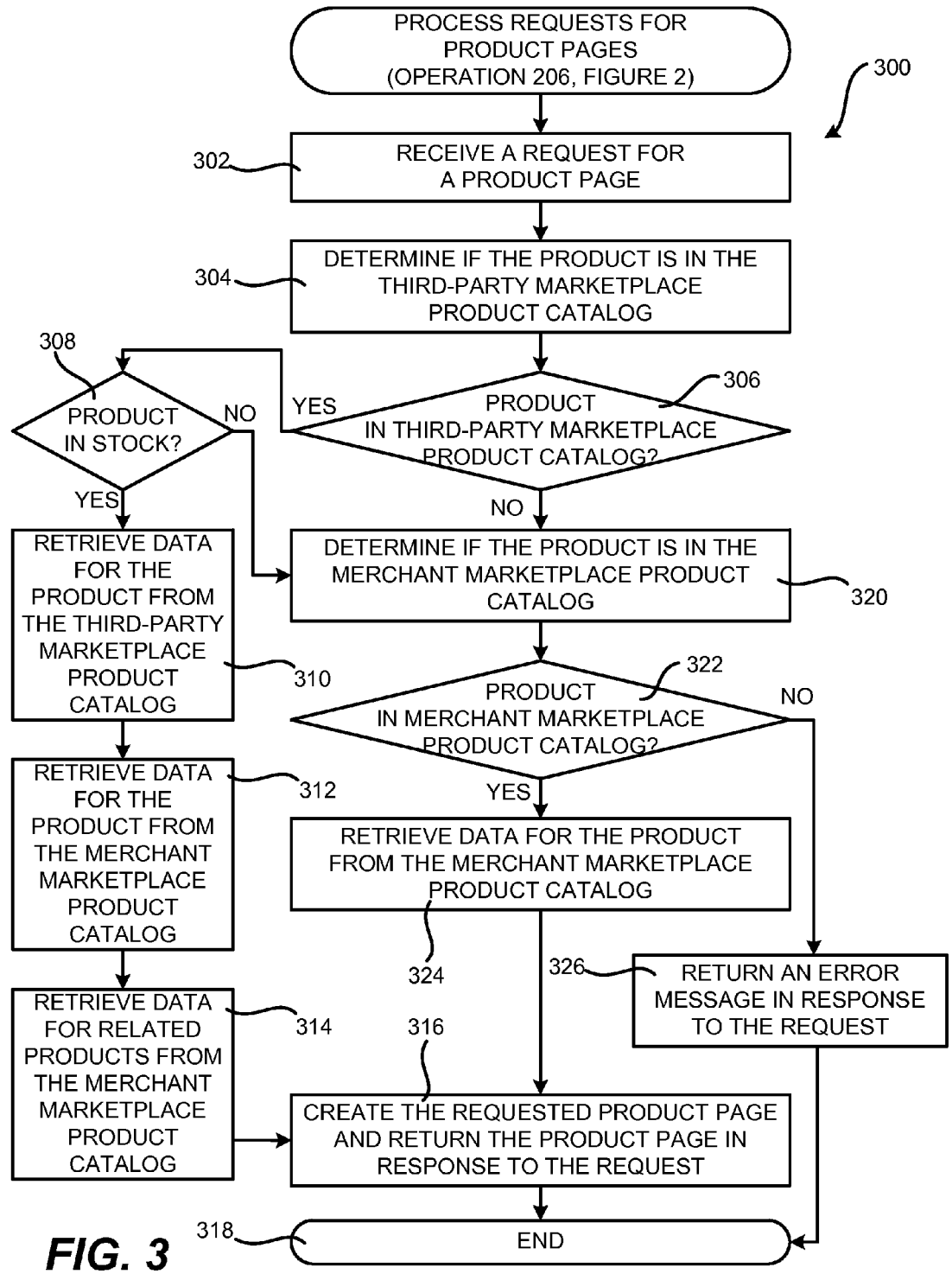
FIG. 3 is a flow diagram showing aspects of one illustrative routine for processing requests for product pages at a marketplace configured with product catalog layering, according to one embodiment disclosed herein.

FIG. 3 is a flow diagram showing aspects of one illustrative routine 300 for processing requests for product pages at a marketplace 118 configured with product catalog layering, according to one embodiment disclosed herein. The routine 300 begins at operation 302, where the merchant system 108 receives a request for a product page from a third-party marketplace 118. The request may be provided in the form of a URL that includes a product identifier corresponding to a product. In response to receiving such a request, the routine 300 proceeds from operation 302 to operation 304.

At operation 304, the merchant system 108 determines whether the product associated with the requested product page is identified in the third-party marketplace product catalog 124 (i.e. a record exists in the third-party marketplace product catalog 124 with a field 126A that includes the supplied product identifier). If the product is identified in the third-party marketplace product catalog 124, the routine 300 proceeds from operation 306 to operation 308. If the product is not identified in the third-party marketplace product catalog 124, the routine 300 proceeds from operation 306 to operation 320, which is described below.

As mentioned above, the third-party merchant might configure catalog layering to be utilized for inventory backup of the third-party marketplace 118. If the third-party merchant has not enabled inventory backup, the routine 300 proceeds directly from operation 306 to operation 310 if the product is identified in the third-party marketplace product catalog 124. If the third-party merchant has enabled inventory backup, a determination is made at operation 308 as to whether the product associated with the requested product page is in stock with the third-party merchant. If the product is not in stock, the routine 300 proceeds from operation 308 to operation 320, where the inventory of the merchant operating the merchant system 108 or another third-party merchant may be utilized to back up the inventor of the third-party merchant associated with the third-party marketplace 118.

If the product associated with the requested product page is in stock with the third-party merchant, the routine 300 proceeds from operation 308 to operation 310. At operation 310, the merchant system 108 retrieves data from the third-party marketplace product catalog 124 for creating the requested product page. For example, the merchant system 108 may retrieve the product definition, product offer details, product reviews, and/or other product information from the third-party marketplace product catalog 124 for the requested product. As will be described in detail below, this information may be utilized to generate the requested product page. From operation 310, the routine 300 proceeds to operation 312.

As discussed above, the third-party merchant may be permitted to configure product catalog layering such that data from the merchant marketplace product catalog 122, such as product reviews, is utilized to supplement the data in the third-party marketplace product catalog 124. If the third-party merchant has configured catalog layering in this manner, data is retrieved from the merchant marketplace product catalog 122 at operation 312. For example, product reviews and/or other information stored in the merchant marketplace product catalog 122 may be retrieved for use in generating the requested product page. From operation 312, the routine 300 proceeds to operation 314.

As also discussed above, the third-party merchant may be permitted to configure product catalog layering such that data regarding products related to the product associated with the requested product page may be retrieved from the merchant marketplace product catalog 122 and utilized to generate the requested product page. If the third-party merchant has configured catalog layering in this manner, data is retrieved from the merchant marketplace product catalog 122 at operation 314 regarding related products. For example, data regarding product accessories or other types of related products may be retrieved for use in generating the requested product page at operation 314. From operation 314, the routine 300 proceeds to operation 316.

At operation 316, the merchant system 108 generates the requested product page utilizing the information retrieved at operations 310, 312, and/or 314. The generated page is then returned in response to the request for the product page. The routine 300 then proceeds to operation 318, where it ends.

If, at operation 306, the merchant system 108 determines that the product associated with the requested product page is not identified in the third-party marketplace product catalog 124, the routine 300 proceeds from operation 306 to operation 320. At operation 320, the merchant system 108 determines whether the product is identified in the merchant marketplace product catalog 122 or in the product catalog of another marketplace for which catalog layering has been enabled. If the product is not identified in another product catalog, the routine 300 proceeds from operation 322 to operation 326, where an error message may be provided in response to the page request indicating that no page is available for the requested product.

If the product is identified in the merchant marketplace product catalog 122, the routine 300 proceeds from operation 322 to operation 324. At operation 324, data is retrieved from the merchant marketplace product catalog 122 for generating the requested page. For instance, the product definition, product offer details, product reviews, and other product information may be retrieved from the merchant marketplace product catalog 122 for generating the requested page. The routine 300 then proceeds from operation 324 to operation 316 where the requested page is generated using the data retrieved at operation 324. The generated page is then returned in response to the original request. The routine 300 then proceeds from operation 316 to operation 318, where it ends.

Figure 4:
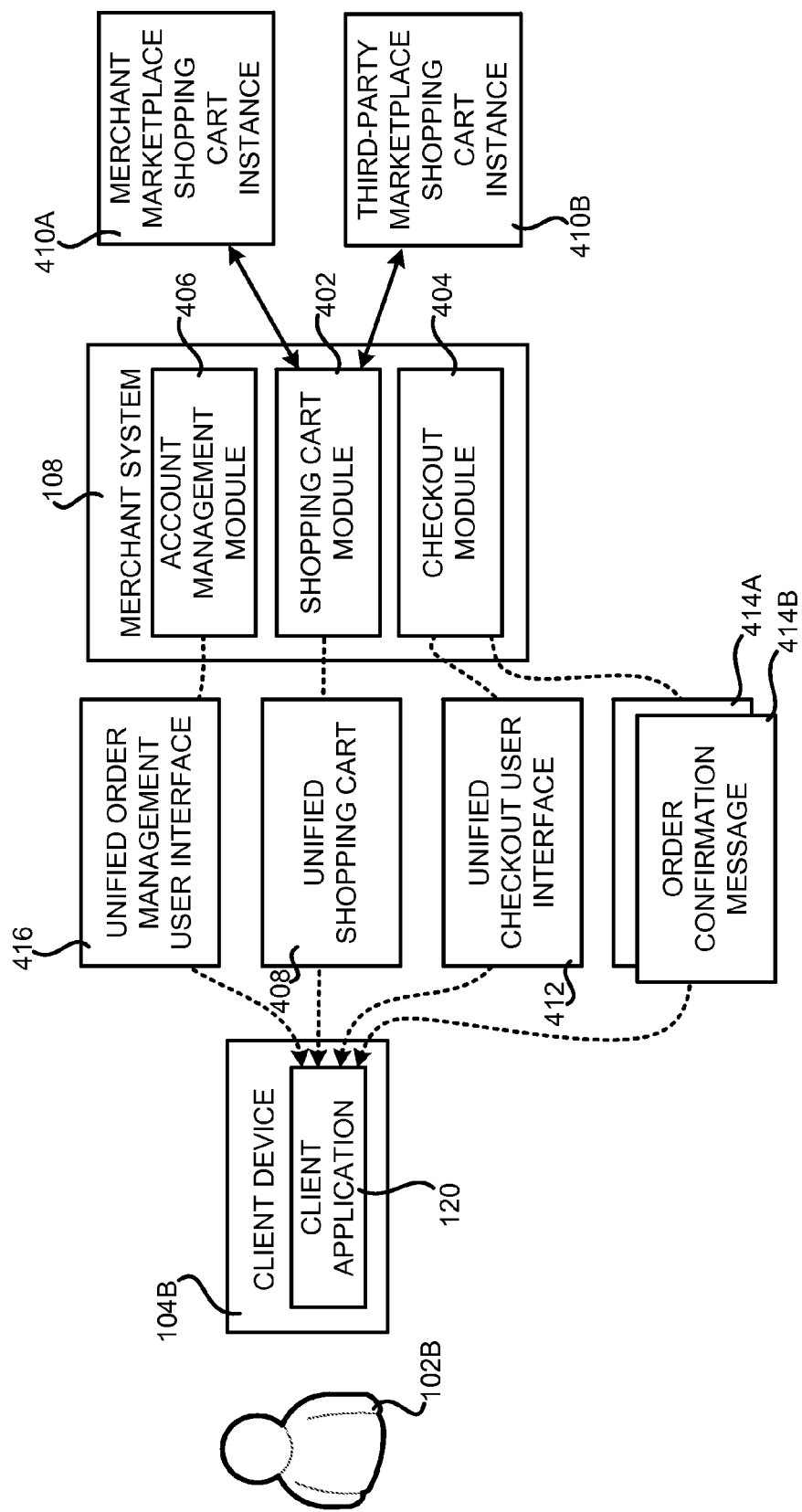
FIG. 4 is a system diagram showing an illustrative configuration for a merchant system that is configured to provide a unified shopping cart, a unified checkout user interface, and a unified order management user interface in conjunction with a marketplace that utilizes product catalog layering, according to one embodiment disclosed herein.

FIG. 4 is a system diagram showing an illustrative configuration for a merchant system 108 that is configured to provide a unified shopping cart 408, a unified checkout user interface 412, and a unified order management user interface 416 in conjunction with a marketplace 118 that utilizes product catalog layering, according to one embodiment disclosed herein. As described briefly above, a user 102B can visit the third-party marketplace 118 and be presented with product pages for products for sale from both the third-party marketplace 118 and one or more other marketplaces, such as the merchant marketplace 116. The user 102B is also able to purchase items from both marketplaces side-by-side without leaving the third-party marketplace 118.

According to one embodiment, the merchant system also executes a shopping cart module 402 to facilitate the purchase of items from multiple marketplaces. In particular, the shopping cart module 402 is configured in one embodiment to provide a unified electronic shopping cart 408 to a user 102B accessing the third-party marketplace 118. For instance, a customer 102B of the third-party marketplace 118 might elect to purchase a first product that is offered for sale directly from the third-party merchant by way of the third-party marketplace 118. The customer 102B might also elect to purchase a product sold through the merchant marketplace 116 that is displayed on the third-party marketplace 118. In this case, a unified electronic shopping cart 408 is presented to the customer 102B that contains purchases from both the third-party marketplace 116 and the merchant marketplace 118. The unified electronic shopping cart 408 might also include items from other merchants when catalog layering is utilized with multiple marketplaces.

In order to provide the unified shopping cart 408, the merchant system 108 utilizes separate shopping cart instances 410 in one embodiment. For example, one shopping cart instance 410A may be utilized for products purchased from the merchant marketplace 116 by way of the third-party marketplace 118. Another shopping cart instance 410B might be utilized for products purchased directly from the third-party marketplace 118. In other embodiments, yet another shopping cart instance might be utilized for products purchased directly through the merchant marketplace 116.

It should be appreciated that the unified shopping cart 408 might also provide other types of functionality in addition to allowing a customer to view products purchased from multiple marketplaces. For example, the unified shopping cart 408 might provide functionality for allowing a customer to interact with the products in the unified shopping cart 408, such as removing products from the unified shopping cart 408, changing the quantities of products in the unified shopping cart 408, and performing other functions on the items.

In some implementations, the merchant system 108 is also configured to provide a unified checkout user interface 412. Through such a user interface 412, a customer 102B of the third-party marketplace 118 can pay for and complete the purchase of products purchased from the third-party marketplace 118 and from the merchant marketplace 116. For example, in one embodiment the customer 102B can apply gift cards and/or promotion codes to purchases made through different marketplaces by way of the unified checkout user interface 412. In this way, the customer 102B only needs to utilize one checkout process to purchase items from multiple marketplaces.

Separate order confirmation messages 414 might also be provided to the customer 102B for items purchased from each marketplace. For example, an order confirmation message 414A may be provided to the customer for items purchased from the third-party marketplace 118. The order confirmation message 414A might include branding elements (e.g. graphics, etc.) associated with the third-party marketplace 118. A separate order confirmation message 414B might be provided for items purchased from the merchant marketplace 116 by way of the third-party marketplace 118. The order confirmation message 414B might include branding elements (e.g. graphics, etc.) associated with the merchant marketplace 116. In other embodiments, a single confirmation message 414 is sent with details regarding items purchased from multiple marketplaces.

In other embodiments, the merchant system 108 is also configured to provide a unified order management user interface 416. Through such a user interface 416, a customer 102B can manage purchases made from multiple marketplaces. For example, the customer 102B might be able to access information regarding the status of an order or to cancel an order placed through either of the marketplaces 116 and 118 through the unified order management user interface 416.

The customer 102B may be permitted to access the unified order management user interface 416 through the merchant marketplace 116 or through the third-party marketplace 118. Additional details regarding the unified shopping cart 408, the unified checkout user interface 412, and the unified order management user interface 416 will be provided below with regard to FIG. 5.

Figure 5:
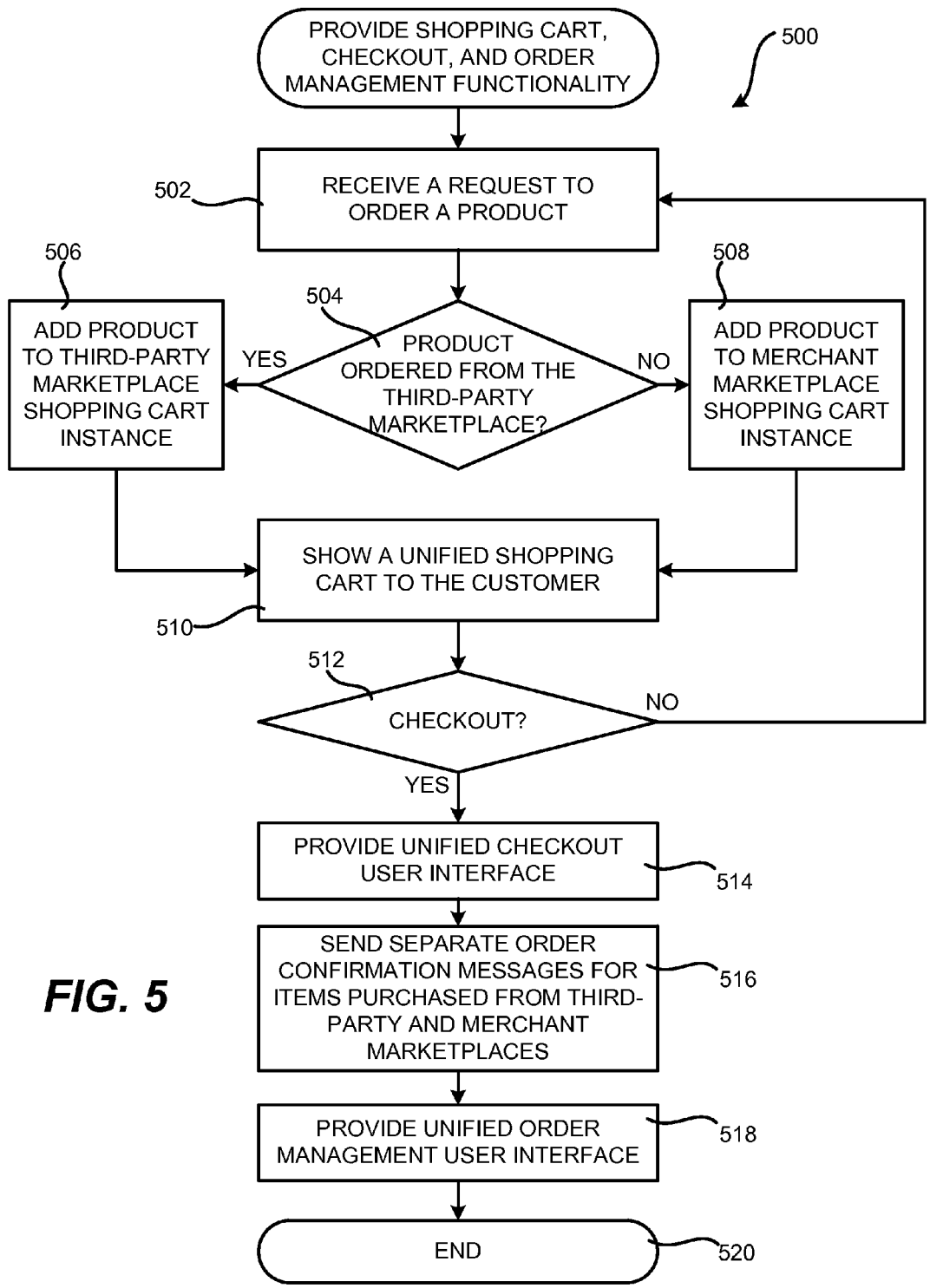
FIG. 5 is a flow diagram showing aspects of one illustrative routine for providing a unified shopping cart, a unified checkout user interface, and a unified order management user interface in conjunction with a marketplace that utilizes product catalog layering, according to one embodiment disclosed herein.

FIG. 5 is a flow diagram showing aspects of one illustrative routine 500 for providing a unified shopping cart 408, a unified checkout user interface 412, and a unified order management user interface 416 in conjunction with a marketplace 118 that utilizes catalog layering, according to one embodiment disclosed herein. The routine 500 begins at operation 502, where the merchant system 108 receives a request to order a product through a third-party marketplace 118. For example, a customer 102B might request that a product be added to his/her shopping cart.

In response to receiving a request to order a product, the routine 500 proceeds from operation 502 to operation 504, where the merchant system 108 determines whether the item was ordered from the third-party marketplace 118 or from another marketplace, such as the merchant marketplace 116. If the product was ordered from the third-party marketplace 118, the routine 500 proceeds to operation 506, where the item is added to the shopping cart instance 410B. If the product was ordered from another marketplace, like the merchant marketplace 116, the item is added to the shopping cart instance 410A. In this manner, the merchant system 108 maintains separate shopping cart instances for items ordered directly from the third-party marketplace 118 and for items ordered from other marketplaces utilizing the third-party marketplace 118.

From operations 506 and 508, the routine 500 proceeds to operation 510 where the merchant system 108 presents a unified shopping cart 408 to the customer 102B. The unified shopping cart 408 includes items in both of the shopping cart instances 410A and 410B. In this manner, the customer 102B only sees a single shopping cart with the items they are purchasing from multiple marketplaces.

From operation 510, the routine 500 proceeds to operation 512, where the merchant system 108 determines whether the customer 102B has requested to check out (i.e. to complete their order). If not, the routine 500 returns to operation 502, described above, where the customer 102B may add additional items to their shopping cart. If the customer 102B has requested to check out, the routine 500 proceeds to operation 514.

At operation 512, the merchant system 108 provides the unified checkout user interface 412 described above. Through this user interface 412, the customer can complete the purchase of items from multiple marketplaces. For example, the customer might be asked to provide payment and/or shipping information only one time to complete the purchase of products from multiple marketplaces. The customer might also be permitted to select and utilize previously provided and stored payment and/or shipping information. The customer might also specify default payment and/or shipping information so that this information does not need to be specified each time a purchase is made. Once the checkout process has completed, the routine 500 proceeds from operation 514 to operation 516.

At operation 516, the merchant system 108 sends separate order confirmation messages 414 for items purchased from different marketplaces. As discussed above, for instance, an order confirmation message 414A may be provided to the customer for items purchased from the third-party marketplace 118 and a separate order confirmation message 414B might be provided for items purchased from the merchant marketplace 116 by way of the third-party marketplace 118. The number of order confirmation messages 414 sent might be equivalent to the number of marketplaces from which items are ordered.

From operation 516, the routine 500 proceeds to operation 518, where the merchant system 108 provides the unified order management user interface 416 described above. As mentioned above, a customer may access the user interface 416 through the third-party marketplace 118 or the merchant marketplace 116. The customer may utilize the user interface 416 to view the status of orders, cancel orders, or perform other types of order management functionality. From operation 518, the routine 500 proceeds to operation 520, where it ends.

It should be appreciated that the functionality described above for product catalog layering might also be utilized to enable other types of functionality. For example, in one implementation the merchant that operates the merchant system 108 also provides order fulfillment services. If the third-party merchant utilizes the fulfillment services to fulfill orders placed at the third-party marketplace 118, then items purchased from the third-party marketplace 118 and items purchased from the merchant marketplace 116 may be shipped in the same box. In this case, special promotions might be offered to customers 102 purchasing items from both the third-party marketplace 118 and the merchant marketplace 116, such as, for instance, free or reduced rate shipping. Other types of promotions and/or offers might also be made in the case where orders placed at the third-party marketplace 118 and the merchant marketplace 116 are fulfilled from the same location.

In other embodiments, products sold through the merchant marketplace 116 might be integrated into a search index associated with the third-party marketplace 118. In this manner, a customer 102B can search for products available through the merchant marketplace 116 side-by-side with products available through the third-party marketplace 118. The search index may be generated in a manner that does not require adding all of the product information from the merchant marketplace product catalog 122 to the search index associated with the third-party marketplace 118. For example, a search engine may be provided with a list of marketplaces from which each product is available. In this manner, the search index can be utilized to determine which marketplaces sell each product without duplicating the product information itself.

In another embodiment, the merchant system 108 might be configured to utilize the data stored in the merchant marketplace product catalog 122 to identify other products that are related to or compatible with the products identified in the third-party marketplace product catalog 124. The merchant system 108 might then make recommendations to the third-party merchant regarding products that they might want to sell on the third-party marketplace 118. Other types of recommendations might also be made to the third-party merchant.

In other embodiments, the third-party marketplace 118 might also be configured to allow customers 102 to check out digital products offered through the merchant marketplace 116. For example, a customer 102B of the third-party marketplace 118 might be permitted to check out books, mobile applications, music and video files, and other types of digital content available from the merchant marketplace 116. The digital content might be delivered directly to the client application 120 from the merchant system 108.

In other embodiments, the technologies disclosed herein for catalog layering might be utilized by the merchant that operates the merchant system 108 to create temporary or experimental marketplaces using their existing merchant marketplace product catalog 122. For instance, the merchant might create a new marketplace that utilizes catalog layering to expose a subset of the products in the merchant marketplace product catalog 122. The new marketplace might be configured with new features, user interfaces, or other components that the merchant would like to test, but does not want to include on the main merchant marketplace 116. In this manner, the merchant can test the new features on a smaller scale but still using the items identified in the merchant marketplace product catalog 122.

It should be appreciated that the embodiments described herein might also be utilized to implement cross-region marketplaces. For example, a third-party marketplace 118 operated by a third-party merchant in the United Kingdom might also offer products from a merchant marketplace 116 located in the United States or another country. Appropriate currency translation mechanisms might also be utilized to convert between currencies when catalog layering is enabled between marketplaces that utilize different types of currencies. Additionally, mechanisms might be provided to filter products available in each region based upon locally applicable laws. In this manner, products that may not be legally sold in a particular region will not be exposed for sale through marketplaces operating in the region.

It should also be appreciated that the organization of the third-party marketplace 118 may be distinct from the organization of the merchant marketplace 116. For example, the third-party merchant operating the third-party marketplace 118 may be permitted to independently create a navigation tree for navigating the product pages of the third-party marketplace 118 that is independent from the manner in which the merchant marketplace 116 organizes its product pages.

It should also be appreciated that the various functions described herein may be performed by the online shopping module 112, the marketplace product catalog layering module 114, the account management module 406, the shopping cart module 402, or the checkout module 404. It should be appreciated, however, that these operations might also be performed by other components, systems, or combinations of components or systems. The particular implementations disclosed herein are merely illustrative and many other types of implementations might be utilized to implement the concepts and technologies described herein.

Figure 6:
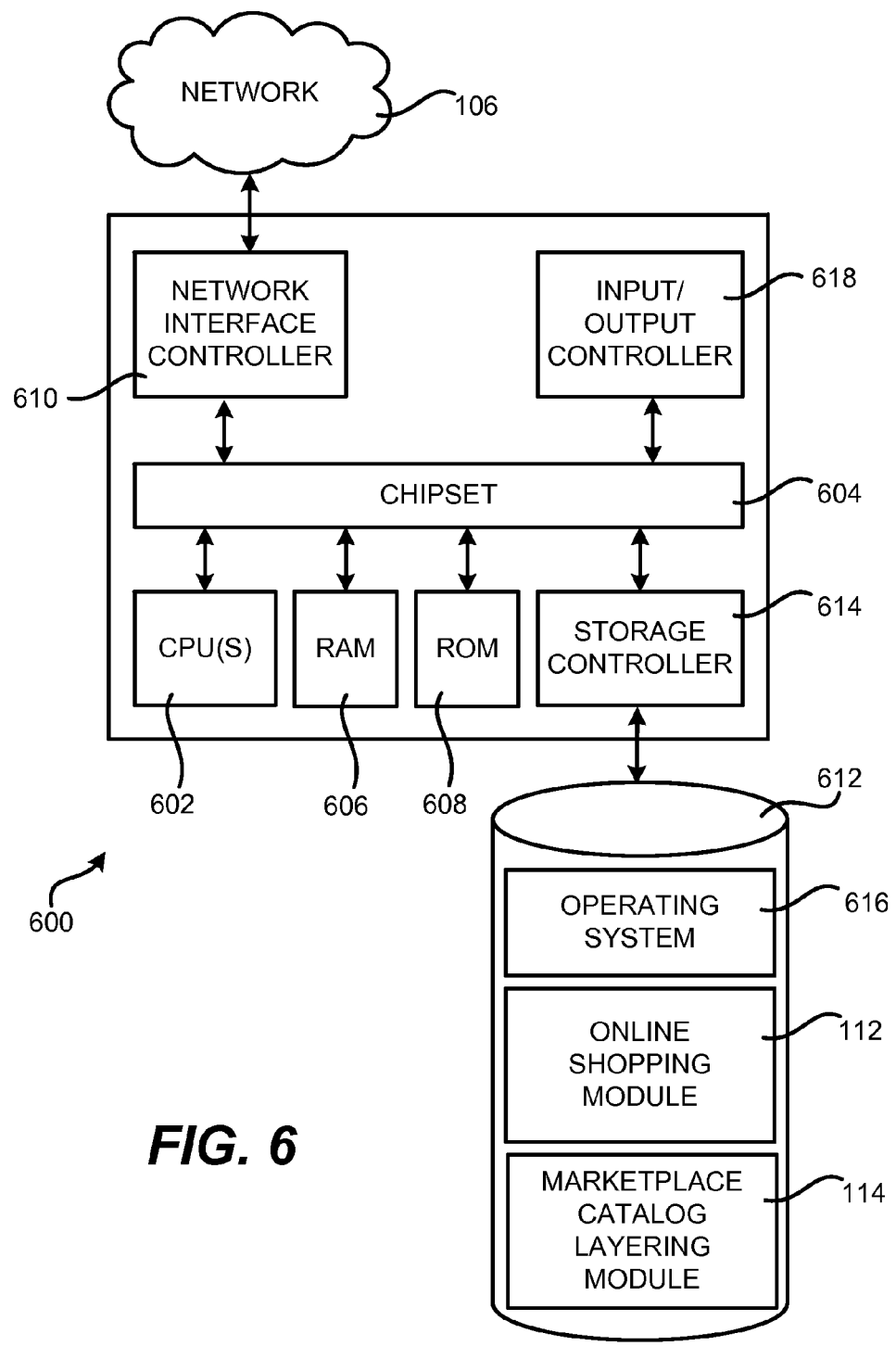
FIG. 6 is a computer architecture diagram showing one illustrative computer hardware architecture for use in computing devices configured to implement the concepts and technologies disclosed herein in one embodiment.

FIG. 6 shows an example computer architecture for a computer 600 capable of executing the software components described herein for providing a marketplace 118 with catalog layering in the manner presented above. The computer architecture 600 shown in FIG. 6 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the application servers 110, the client devices 104, or other computing platform.

The computer 600 includes a baseboard, or "motherboard," which is a printed circuit board to which a multitude of components or devices may be connected by way of a system bus or other electrical communication paths. In one illustrative embodiment, one or more central processing units ("CPUs") 602 operate in conjunction with a chipset 604. The CPUs 602 are standard programmable processors that perform arithmetic and logical operations necessary for the operation of the computer 600.

The CPUs 602 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 604 provides an interface between the CPUs 602 and the remainder of the components and devices on the baseboard. The chipset 604 may provide an interface to a random access memory ("RAM") 606, used as the main memory in the computer 600. The chipset 604 may further provide an interface to a computer-readable storage medium such as a read-only memory ("ROM") 608 or non-volatile RAM ("NVRAM") for storing basic routines that help to startup the computer 600 and to transfer information between the various components and devices. The ROM 608 or NVRAM may also store other software components necessary for the operation of the computer 600 in accordance with the embodiments described herein.

According to various embodiments, the computer 600 may operate in a networked environment using logical connections to remote computing devices and computer systems through a network, such as a local-area network ("LAN"), a wide-area network ("WAN"), the Internet, or any other networking topology known in the art that connects the computer 600 to remote computers. The chipset 604 includes functionality for providing network connectivity through a network interface controller ("NIC") 610, such as a gigabit Ethernet adapter.

For example, the NIC 610 may be capable of connecting the computer 600 to other computing devices, such as the application servers 110, the client devices 104, a data storage system in the merchant system 108, and the like, over the network 106 described above in regard to FIG. 1. It should be appreciated that multiple NICs 610 may be present in the computer 600, connecting the computer to other types of networks and remote computer systems.

The computer 600 may be connected to a mass storage device 612 that provides non-volatile storage for the computer. The mass storage device 612 may store system programs, application programs, other program modules, and data, which have been described in greater detail herein. The mass storage device 612 may be connected to the computer 600 through a storage controller 614 connected to the chipset 604. The mass storage device 612 may consist of one or more physical storage units. The storage controller 614 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 600 may store data on the mass storage device 612 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 612 is characterized as primary or secondary storage, or the like.

For example, the computer 600 may store information to the mass storage device 612 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 612 by detecting the physical states or characteristics of one or more particular locations within the physical storage units.

In addition to the mass storage device 612 described above, the computer 600 might have access to other computer-readable media to store and retrieve information, such as program modules, data structures, or other data. It should be appreciated by those skilled in the art that computer-readable media can be any available media that may be accessed by the computer 600, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 612 may store an operating system 616 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 612 might also store other system or application programs and data utilized by the computer 600. For instance, when utilized to implement the client device 104, the mass storage device 612 may store the client application 120. When utilized to implement one or more of the application servers 110, the mass storage device may store the online shopping module 112, the marketplace product catalog layering module 114, the shopping cart module 402, the checkout module 404, and/or the order management module 406. The mass storage device 612 might also store other programs and data for use in implementing the various embodiments disclosed herein.

In one embodiment, the mass storage device 612 or other computer-readable storage media may be encoded with computer-executable instructions that, when loaded into the computer 600, transform the computer from a general-purpose computing system into a special-purpose computer capable of implementing the embodiments described herein. These computer-executable instructions transform the computer 600 by specifying how the CPUs 602 transition between states, as described above. According to one embodiment, the computer 600 has access to computer-readable storage media storing computer-executable instructions that, when executed by the computer, perform the various routines and operations described herein.

The computer 600 may also include an input/output controller 618 for receiving and processing input from a number of input devices, such as a keyboard, a mouse, a touchpad, a touch screen, an electronic stylus, or other type of input device. Similarly, the input/output controller 618 may provide output to a display device, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for marketplace product catalog layering have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for marketplace product catalog layering, the computer-implemented method comprising executing instructions in a computer system to perform the operations of:
   providing a merchant marketplace offering products for sale from a merchant marketplace product catalog by way of one or more computer systems;
   providing a third-party marketplace offering products for sale from a third-party marketplace product catalog by way of one or more computer systems;
   receiving a request at the third-party marketplace for a product page for a product;
   in response to receiving the request, determining by way of one or more computer systems whether the product is listed in the third-party marketplace product catalog;
   in response to determining that the product is listed in the third-party marketplace product catalog, generating by way of one or more computer systems the requested product page using the third-party marketplace product catalog;
   in response to determining that the product is not listed in the third-party marketplace product catalog, generating the requested product page by way of one or more computer systems using the merchant marketplace product catalog; and
   responding to the request by way of one or more computer systems with the generated product page.

2. The computer-implemented method of claim 1, further comprising in response to determining that the product is listed in the third-party marketplace product catalog:
   determining whether a third-party merchant associated with the third-party marketplace has the product in stock; and
   responding to the request with the product page generated using the merchant marketplace product catalog in response to determining that the third-party merchant does not have the product in stock.

3. The computer-implemented method of claim 1, further comprising in response to determining that the product is listed in the third-party marketplace product catalog:
   generating the requested product page using the merchant marketplace product catalog and using the third-party marketplace product catalog.

4. The computer-implemented method of claim 1, further comprising in response to determining that the product is listed in the third-party marketplace product catalog:
  retrieving data for one or more other products related to the product from the merchant marketplace product catalog; and
  generating the requested product page utilizing the retrieved data for the one or more other products and the third-party marketplace product catalog.

5. The computer-implemented method of claim 1, further comprising:
  receiving a request to purchase a first product from the merchant marketplace and, in response thereto, to place an identifier for the first product into a first instance of an electronic shopping cart;
  receiving a request to purchase a second product from the third-party marketplace and, in response thereto, to place an identifier for the second product into a second instance of an electronic shopping cart; and
  providing a single user interface for viewing and interacting with the first instance and the second instance of the electronic shopping cart.

6. A computer-readable storage medium having computer-executable instructions stored thereupon which, when executed by the computer, cause the computer to:
  provide a first marketplace configured to offer products for sale from a first product catalog;
  provide a second marketplace configured to offer products for sale from a second product catalog;
  use the second product catalog to satisfy requests for product pages received at the second marketplace for products that are listed in the second product catalog; and to
  use the first product catalog to satisfy requests for product pages received at the second marketplace for products that are not listed in the second product catalog.

7. The computer-readable storage medium of claim 6, having further computer-executable instructions stored thereupon which, when executed by the computer, cause the computer to:
  use the first product catalog and the second product catalog to satisfy requests for product pages received at the second marketplace for products not listed in the second product catalog.

8. The computer-readable storage medium of claim 6, having further computer-executable instructions stored thereupon which, when executed by the computer, cause the computer to:
  use the first product catalog to satisfy requests for product pages received at the second marketplace for products that are not in stock with a merchant associated with the second marketplace.

9. The computer-readable storage medium of claim 8, having further computer-executable instructions stored thereupon which, when executed by the computer, cause the computer to provide a unified shopping cart for purchases from the first marketplace and for purchases from the second marketplace.

10. The computer-readable storage medium of claim 9, having further computer-executable instructions stored thereupon which, when executed by the computer, cause the computer to provide a single checkout user interface for completing purchases of products from the first marketplace and for completing purchases of products from the second marketplace.

11. An apparatus for marketplace product catalog layering, the apparatus comprising:
  at least one processor; and
  a computer-readable storage medium having computer-executable instructions stored thereon which, when executed on the at least one processor, cause the apparatus to
  provide a first marketplace configured to offer items for sale from a first catalog; and to
  provide a second marketplace configured to offer items for sale from a second catalog, to display items for sale from the first marketplace, and to allow items from the first marketplace to be purchased.

12. The apparatus of claim 11, wherein the computer-readable storage medium has further computer-executable instructions stored thereon which, when executed on the at least one processor, cause the apparatus to:
  receive one or more criteria for determining the items from the first marketplace that are to be displayed and offered for sale by way of the second marketplace.

13. The apparatus of claim 12, wherein the criteria comprises one or more of: the identity of a merchant associated with the first marketplace; a rating of the merchant associated with the first marketplace; a profit or profit margin associated with items from the first marketplace; a promotion offered by a merchant associated with the first marketplace; or a shipping time for items from the first marketplace.

14. The apparatus of claim 11, wherein the computer-readable storage medium has further computer-executable instructions stored thereon which, when executed on the at least one processor, cause the apparatus to:
  receive a request at the second marketplace for a product page corresponding to an item;
  determine in response to receiving the request whether the item is listed in the second catalog; and
  in response to determining that the item is listed in the second catalog, to generate the product page using the second catalog, and to respond to the request with the generated product page.

15. The apparatus of claim 14, wherein the computer-readable storage medium has further computer-executable instructions stored thereon which, when executed on the at least one processor, cause the apparatus to:
  in response to determining that the item is not listed in the second catalog, to generate the product page using the first catalog, and to respond to the request with the generated product page.

16. The apparatus of claim 15, wherein the computer-readable storage medium has further computer-executable instructions stored thereon which, when executed on the at least one processor, cause the apparatus to:
  determine whether a merchant associated with the second marketplace has the item in stock;
  in response to determining that the merchant associated with the second marketplace has the item in stock, to generate the product page using the second catalog; and
  in response to determining that the merchant associated with the second marketplace does not have the item in stock, to generate the product page using the first catalog.

17. The apparatus of claim 15, wherein the computer-readable storage medium has further computer-executable instructions stored thereon which, when executed on the at least one processor, cause the apparatus to:
  generate the product page using the first catalog and the second catalog in response to determining that the item is listed in the second catalog.

18. The apparatus of claim 15, wherein the computer-readable storage medium has further computer-executable instructions stored thereon which, when executed on the at least one processor, cause the apparatus to:
generate the product page using the second catalog and data from the first catalog regarding one or more other items related to the item in response to determining that the item is listed in the second catalog.

19. The apparatus of claim 15, wherein the computer-readable storage medium has further computer-executable instructions stored thereon which, when executed on the at least one processor, cause the apparatus to:
receive a request to purchase a first item from the first marketplace and, in response thereto, to place an identifier for the first item into a first instance of an electronic shopping cart;
receiving a request to purchase a second item from the second marketplace and, in response thereto, to place an identifier for the second item into a second instance of an electronic shopping cart; and to
provide a single user interface for viewing and interacting with the first instance of the electronic shopping cart and the second instance of the electronic shopping cart.

20. The apparatus of claim 19, wherein the computer-readable storage medium has further computer-executable instructions stored thereon which, when executed on the at least one processor, cause the apparatus to:
provide a single checkout user interface for completing a purchase of the first item in the first instance of the electronic shopping cart and the second item in the second instance of the electronic shopping cart.

21. The apparatus of claim 20, wherein the computer-readable storage medium has further computer-executable instructions stored thereon which, when executed on the at least one processor, cause the apparatus to:
transmit a single confirmation message following the completion of the purchase of the first item and the second item containing details regarding the purchase of the first item from the first marketplace and details regarding the purchase of the second item from the second marketplace.

22. The apparatus of claim 21, wherein the computer-readable storage medium has further computer-executable instructions stored thereon which, when executed on the at least one processor, cause the apparatus to:
provide a unified order management user interface for managing purchases made from the first marketplace and for managing purchases made from the second marketplace.

* * * * *